United States Patent [19]

Yamashita et al.

[11] Patent Number: 5,760,779
[45] Date of Patent: Jun. 2, 1998

[54] METHOD AND APPARATUS FOR GENERATING AN ANALYZING MESH FOR A THREE-DIMENSIONAL AREA

[75] Inventors: Yoshifumi Yamashita; Hiromitsu Moriyama, both of Yokohama; Masao Kawai, Kawasaki; Kimitaka Tamura, Yokohama, all of Japan

[73] Assignee: Hitachi, Ltd., Tokyo, Japan

[21] Appl. No.: 496,321

[22] Filed: Jun. 29, 1995

[30] Foreign Application Priority Data

Jun. 29, 1994 [JP] Japan .................. 6-147410

[51] Int. Cl.⁶ .............. G06F 15/40; G06F 15/62; G06F 15/72
[52] U.S. Cl. .................................. 345/421
[58] Field of Search ................ 395/800, 118, 395/119, 120, 121; 345/418, 419, 420, 421

[56] References Cited

U.S. PATENT DOCUMENTS

| | | | |
|---|---|---|---|
| 4,775,946 | 10/1988 | Anjyo | 364/522 |
| 4,893,260 | 1/1990 | Arakawa | 364/564 |
| 4,912,664 | 3/1990 | Weiss et al. | 364/577 |
| 4,933,889 | 6/1990 | Meshkat et al. | 364/578 |
| 4,941,114 | 7/1990 | Shigyo et al. | 364/578 |
| 5,010,501 | 4/1991 | Arakawa | 364/522 |
| 5,113,490 | 5/1992 | Winget | 395/119 |
| 5,125,038 | 6/1992 | Meshkat et al. | 382/22 |
| 5,214,752 | 5/1993 | Meshkat et al. | 395/123 |
| 5,315,537 | 5/1994 | Blacker | 364/570 |
| 5,553,009 | 9/1996 | Meshkat et al. | 364/578 |
| 5,553,206 | 9/1996 | Meshkat | 395/123 |
| 5,590,248 | 12/1996 | Zarge et al. | 395/121 |

OTHER PUBLICATIONS

K. Toritani et al. "Bases and Applications of Three-Dimensional CAD", Kyoritsu Publishing Co., 1991, pp. 206–208.

*Primary Examiner*—Larry D. Donaghue
*Attorney, Agent, or Firm*—Antonelli, Terry, Stout & Kraus, LLP

[57] ABSTRACT

Sub-areas divided from a three-dimensional areas to be analyzed are generated by hexahedron meshes as much as possible, and for the sub-areas not formed by the hexahedron elements, tetrahedron meshes are generated by a tetrahedron mesh generation unit. For the mesh generation of the sub-area adjacent to the hexahedron mesh area and the tetrahedron mesh area, the data of other sub-area for which the mesh has been generated which is adjacent to the sub-area for which the mesh is to be generated is searched from a sub-area data area and a mesh shape formed by a plurality of triangles on the surface of the area for which the mesh is to be generated from the mesh shape on the joining plane to the adjacent sub-area to generate a quadrilateral mesh in the area for which the mesh is to be generated.

11 Claims, 10 Drawing Sheets

METHOD AND APPARATUS FOR GENERATING AN ANALYZING MESH FOR A THREE-DIMENSIONAL AREA

BACKGROUND OF THE INVENTION

The present invention relates to method and apparatus for generating mesh data necessary for a finite element method or a finite volume method which is a numerical analysis method utilizing a computer, and more particularly to a system for automatically generating a three-dimensional tetrahedron or hexahedron mesh.

A finite element analysis for computing a strength of a construction by using a computer analyzes a three dimensional area to be analyzed by expressing it as an aggregation of finite elements of hexahedrons and tetrahedrons. The number of finite elements amounts to, in many cases, several hundreds to several tens thousands. The finite element may be simply referred to as an element. An apex of each element is connected to a point called a node and an adjacent element is coupled through the node. An aggregation of elements and nodes is referred to as a mesh and data representing the mesh is referred to as mesh data. A system for generating an analyzing mesh generates the mesh data of an area to be analyzed by utilizing a computer.

A method for generating the mesh is classified into two. One is a method for generating hexahedron elements and the other is a method for generating tetrahedron elements.

In the method for generating the hexahedron elements, automatic generation of the hexahedron elements may be attained by using a computer for a simple three-dimensional area shape such as a parallelepiped but not for a complex shape. Thus, in the present technology, it is not possible to automatically generate a mesh, in a single run, for any three-dimensional shape by the method using the hexahedron elements. Accordingly, a method is used in which the entire three-dimensional area is divided into a plurality of sub-areas and a hexahedron mesh is automatically generated for each sub-area.

Figure 2:
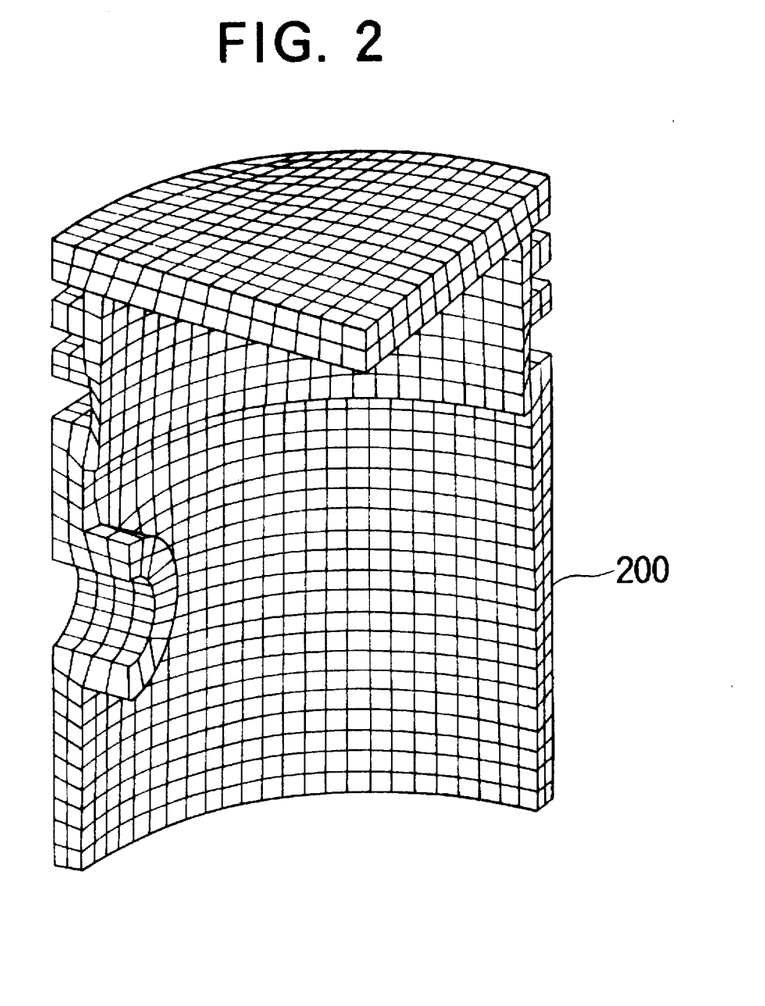
FIG. 2 shows a perspective view of an example of a mesh generated by hexahedron elements.

In this case, however, it is necessary that the shape of the sub-area is one which allows the computer to automatically generate the hexahedron elements. For example, the sub-area must have a topology of a parallelepiped or a combination of parallelepipeds. Thus, this approach has a problem in that the shape of the sub-area must be of a special shape as described above and hence the division into the sub-areas must be performed manually. For a complex shape, the division into the sub-areas is performed in a trial and cut manner so that a large manpower is required. In FIG. 2, numeral 200 denotes a three-dimensional area having a hexahedron mesh generated in this method.

Figure 3:
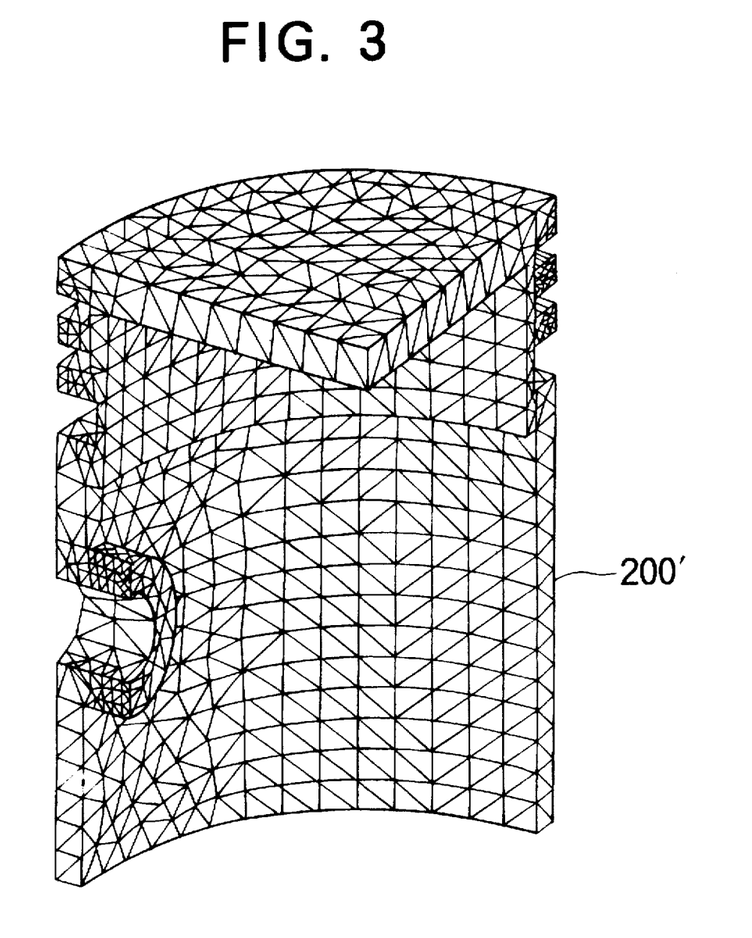
FIG. 3 shows a perspective view of an example of a mesh generated by tetrahedron elements.

On the other hand, the method using the tetrahedron elements allows the automatic generation of he mesh for any three-dimensional shape. A manpower required to generate the mesh for a complex shape area is much less than that of the tetrahedron element method. In FIG. 3, numeral 200' denotes a three-dimensional area having a tetrahedron mesh generated in this method.

On the other hand, as for a precision of analysis, the precision of analysis of the three-dimensional area by using the tetrahedron elements is lower than that attained by using the hexahedron elements. For the tetrahedron elements, in order to improve the precision of analysis, a size of the mesh in generating the mesh may be made sufficiently small. In this case, however, the number of nodes and the number of elements are huge, which results in a very long execution time of an analysis program and a need for a large amount of resources of the computer system such as memories and disks.

A method for generating the tetrahedron elements is described in "Bases And Applications Of Three-Dimensional CAD" by Kouji Toritani and Hiroaki Chiyokura, Kyoritsu Publishing Co., 1991, pages 206–208. A method for generating a mesh by the tetrahedron elements is described in the same article, pages 203–206.

In the method described in the above reference, when a mesh is to be generated for a three-dimensional area to be analyzed, only one of the mesh generation method by the tetrahedron elements or the mesh generation method by the tetrahedron elements is applied. Accordingly, when a complex shape is to be analyzed, either the precision of analysis is prioritized so that a huge amount of manpower is used to generate the mesh by the hexahedron elements or the mesh is automatically generated by the tetrahedron elements at the expense of the precision of analysis, and a method for generating the mesh which permits the coexistence of both methods to attain high precision of analysis has not been proposed.

Namely, exact analysis is not attained where a sub-area generated by the tetrahedron elements (hereinafter referred to as an area 1) and a sub-area generated by the hexahedron elements (hereinafter referred to as an area 2) are simply spatially adjacent. In order to attain the exact analysis, it is necessary that coordinates of all nodes on a plane belonging to the area 1 and adjoining to the area 2 at the boundary of the areas completely match with coordinates of all nodes on a plane belonging to the area 2 and adjoining to the area 1. In order to attain high precision of analysis, it is necessary that element division patterns also completely match. If it is not possible to completely match the element division patterns, it is necessary to match the element division patterns as much as possible and the degree of the precision of analysis is determined by the degree of match. In the technology disclosed in the above reference, it has not been proposed how to match the coordinates of all nodes on the plane belonging to the area 1 and adjoining to the area 2 in the boundary area to the coordinates of all nodes on the plane belonging to the area 2 and adjoining to the area 1, rather than simply spatially adjoining the sub-area generated by the hexahedron elements to the sub-area generated by the tetrahedron elements.

SUMMARY OF THE INVENTION

It is an object of the present invention to provide method and apparatus for generating an analyzing mesh which allows the generation of mesh data of a high precision of analysis with a small manpower by coupling a sub-area generated by tetrahedron elements and a sub-area generated by hexahedron elements with a relatively high precision even if the sub-areas coexist in a complex shape three-dimensional area.

In order to attain the above object, in a preferred embodiment of the present invention, an analyzing mesh generation system for generating a mesh for an entire area by generating the mesh for each of a plurality of sub-areas comprises means for generating a mesh of hexahedron elements in the sub-area and means for generating a mesh of tetrahedron elements in the sub-area, and for a sub-area for which a new mesh is to be generated therein, a sub-area which is adjacent thereto and for which a mesh has been generated is searched, a surface mesh shape on an joining plane of the detected adjacent sub-area for which the mesh has been generated is extracted, the extracted surface mesh shape is defined as a surface mesh shape on the joining plane to the sub-area for which the new mesh is to be generated, and the mesh is generated therein.

If the extracted surface mesh shape comprises only quadrilaterals, the surface mesh shape on the joining plane to the sub-area for which the new mesh is to be generated is defined as quadrilateral, and if the extracted surface mesh shape comprises only triangles or a combination of triangles and quadrilaterals or if it is known that the sub-area for which the new mesh is to be generated cannot be generated by the hexahedron elements, the surface mesh shape on the joining plane to the sub-area for which the new mesh is to be generated is defined as triangle and the mesh is generated in the sub-area for which the new mesh is to be generated.

Further, if a quadrilateral is included in the surface mesh shape on the joining plane to the detected sub-area for which the mesh has been generated and the surface mesh shape on the joining plane to the sub-area for which the new mesh is to be generated is defined as the triangle, an aggregation of two triangles defined by a diagonal line drawn on the quadrilateral is defined as the surface mesh shape on the joining plane to the sub-area for which the new mesh is to be generated.

Thus, for the sub-area for which the new mesh is to be generated, if there are a plurality of sub-areas adjacent thereto and the elements in all of those sub-areas are either the hexahedron elements or the tetrahedron elements, the mesh may be generated therein by the same elements while the surface mesh shape on the joining plane completely matches thereto.

Further, if a sub-area having the mesh thereof generated by only the hexahedron elements and a sub-area having the mesh thereof generated by only the tetrahedron elements coexist in the adjacent sub-areas, an aggregation of two triangles defined by a diagonal line drawn to each of the quadrilaterals forming the surface mesh shape on the joining plane to the adjacent sub-area for which the mesh is to be generated by the hexahedron elements is defined as the surface mesh shape and the mesh is generated by the tetrahedron elements in the sub-area for which the mesh is to be generated to generate the mesh having matched division pattern on the joining plane.

In accordance with the preferred embodiment of the present invention, the sub-area having the mesh thereof generated by the hexahedron elements and the sub-area having the mesh thereof generated by the tetrahedron elements may be placed adjacently to each other while the numbers of nodes and the positions thereof on the joining plane are completely matched. Namely, the nodes on the joining plane may be shared. It is described in the above reference, pages 205–206 that the mesh by the hexahedron elements may be automatically generated in the triangle when the surface mesh shape is defined as the triangle and the explanation thereof is omitted herein.

DESCRIPTION OF THE PREFERRED EMBODIMENTS

The preferred embodiments of the present invention will be explained in detail in conjunction with the accompanying drawings.

Figure 1:
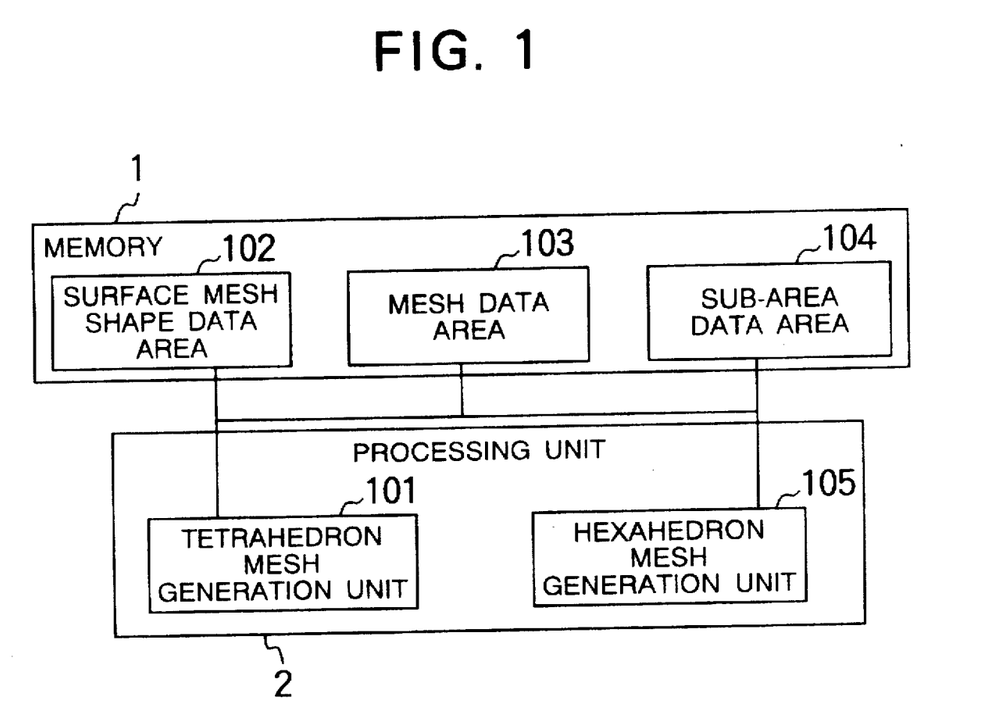
FIG. 1 shows a configuration of an embodiment of a mesh generation apparatus of the present invention.

FIG. 1 shows a configuration of an embodiment of the present invention. A memory 1 includes at least a surface mesh shape data area 102, a mesh data area 103 and a sub-area data area 104. The surface mesh shape data are 102 stores data on a mesh shape of a surface of a sub-area for which a mesh has been generated and data for identifying a specific sub-area and a specific surface to which the data relates. The sub-area data area 104 stores topological data representing a shape of each sub-area and data identifying whether the mesh has been generated or not.

A processing unit 2 may comprise a CPU which includes at least a hexahedron mesh generation unit 105 and a tetrahedron mesh generation unit 101. The hexahedron mesh generation unit 105 generates a mesh by the hexahedron elements in the sub-area, registers the mesh data in the mesh data area 103 and registers the data of the surface mesh shape in the mesh shape data area 102. The tetrahedron mesh generation unit 101 generates a mesh by the tetrahedron elements in the sub-area. The generated mesh data and surface mesh shape data are registered in 103 and 102, respectively, as they are for the hexahedron mesh generation unit 105.

Figure 12:
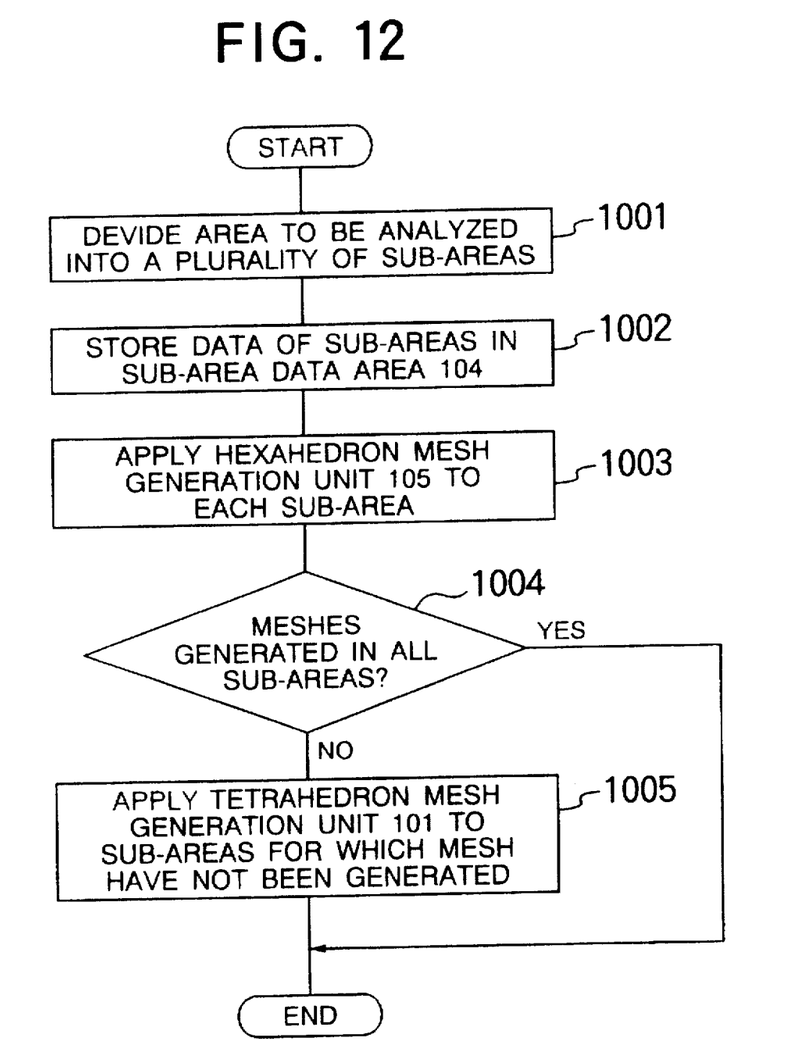
FIG. 12 shows a flow chart of a mesh generation process in the present invention.

With this arrangement, a mesh generation process in the present embodiment is now explained in conjunction with a flow chart of FIG. 12. First, in a step 1001, an area to be analyzed is divided into appropriate sub-areas by a CAD shape modeling function. The division into the sub-areas may be done either manually by a user or automatically by a computer. Data representing the shape of each sub-area resulting from the step 1001 is stored in the sub-area data area 104 of FIG. 1 in a step 1002.

In a step 1003, the mesh by the hexahedron elements is generated by the hexahedron mesh generation unit 105 of FIG. 1 for each of the sub-areas. If the meshes are automatically generated by the hexahedron elements for all of the sub-areas, it means that a most ideal mesh has been generated. In a step 11004, the entire process is terminated.

For a sub-area of a complex shape, the automatic mesh generation by the hexahedron elements is not attained, and after the step 1004, the control is shifted to a step 1005. In this case, the sub-areas are divided into sub-areas for which a mesh has been generated and sub-areas for which a mesh has not been generated. For the sub-areas for which the mesh has not been generated, the tetrahedron mesh generation unit 101 of FIG. 1 is applied in a step 1005 to automatically generate the mesh by the tetrahedron elements.

Figure 4:
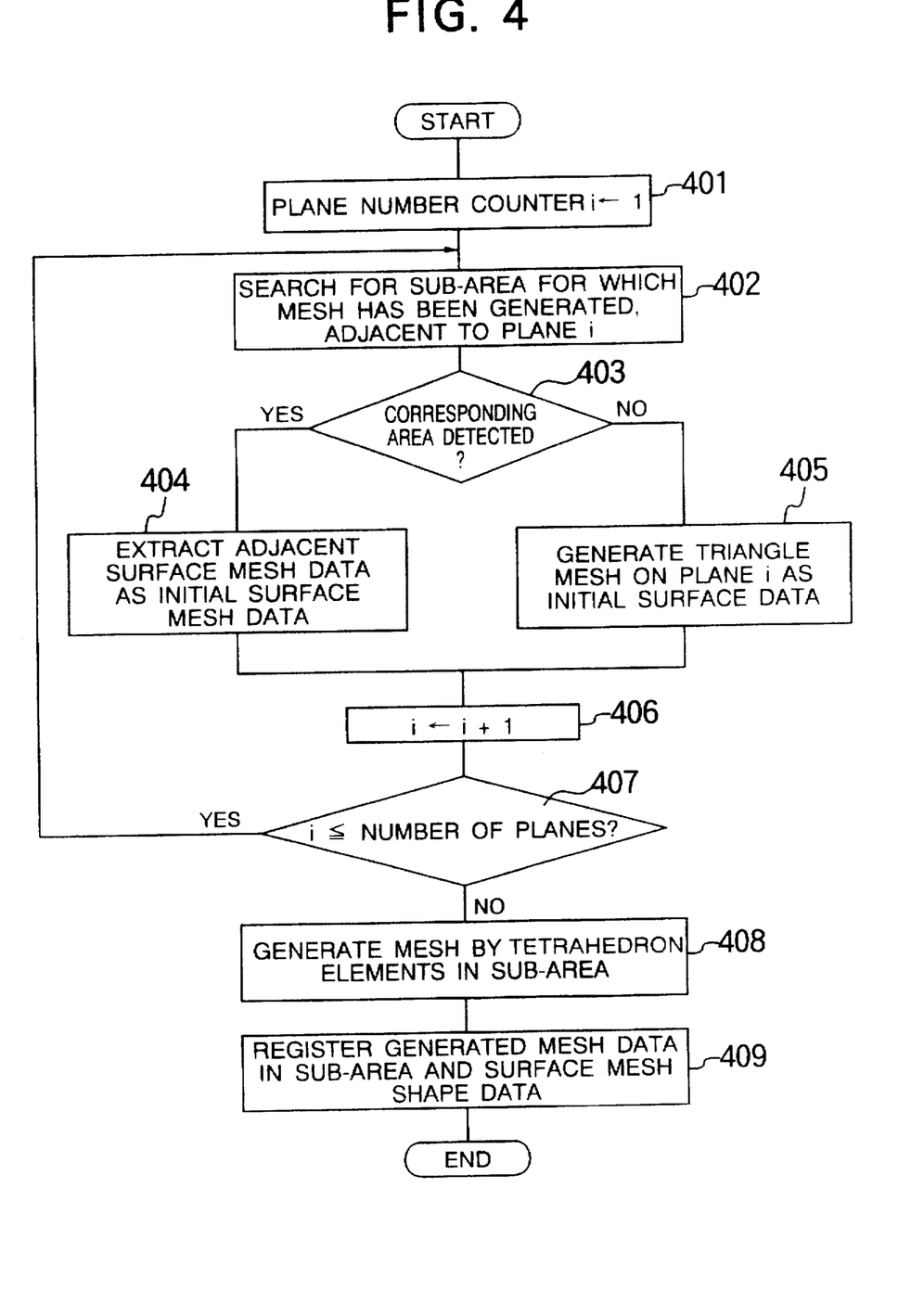
FIG. 4 shows a flow chart of a process of a tetrahedron mesh generation unit 101 shown in FIG. 1.

A detailed process of the tetrahedron mesh generation unit 101 of FIG. 1 for generating the tetrahedron mesh for the sub-area joining to the hexahedron mesh area and the tetrahedron mesh area while the process of the sub-area has been proceeded to some extent is explained by referring to a flow chart of FIG. 4.

In FIG. 4, in a step 401, a plane number counter i representing a plane number added to each of a plurality of planes forming a sub-area for which a mesh is to be generated is initialized to 1.

In a step 402, a sub-area for which a mesh has been generated, adjacent to the plane i is searched from the sub-area data area 104 of FIG. 1.

In a step 403, if the sub-area for which the mesh has been generated is detected in the step 402, the control is shifted to a step 404, otherwise the control is shifted to a step 405.

In the step 404, the surface mesh data on the joining plane of the adjacent sub-area detected in the step 402 is fetched from the surface mesh shape data area 102 of FIG. 1. For each mesh therein, two triangles defined by drawing a diagonal line in a quadrilateral if it is a quadrilateral and a triangle as it is if it is a triangle is prepared as the initial surface mesh data. A more detailed process of the step 404 will be described later.

In a step 405, triangle elements are generated on the plane i to generate the initial surface mesh data. A method for generating the triangle elements is described in the above reference, pages 203–205 and the explanation thereof is omitted herein. The initial mesh data generated in the steps 404 and 405 are generated in a temporarily saved data area.

In a step 406, the plane number counter i is incremented by one to be ready for the processing of a next plane.

In a step 407, when i is smaller than the total number of planes of the sub-area, the control is shifted to the step 402 to process the next plane, otherwise the control is shifted to a step 408.

In the step 408, a mesh by the tetrahedron elements is generated in the sub-area. The mesh is generated such that the mesh shape on the surface matches to the initial surface mesh data of each plane generated in the steps 404 and 405.

In a step 409, the mesh data in the sub-area generated in the step 408 is registered in the mesh data area 103 of FIG. 1. The initial surface mesh data for all planes generated in the steps 404 and 405 are registered in the surface mesh shape data area 102 of FIG. 1 as the surface mesh shape data.

Figure 5:
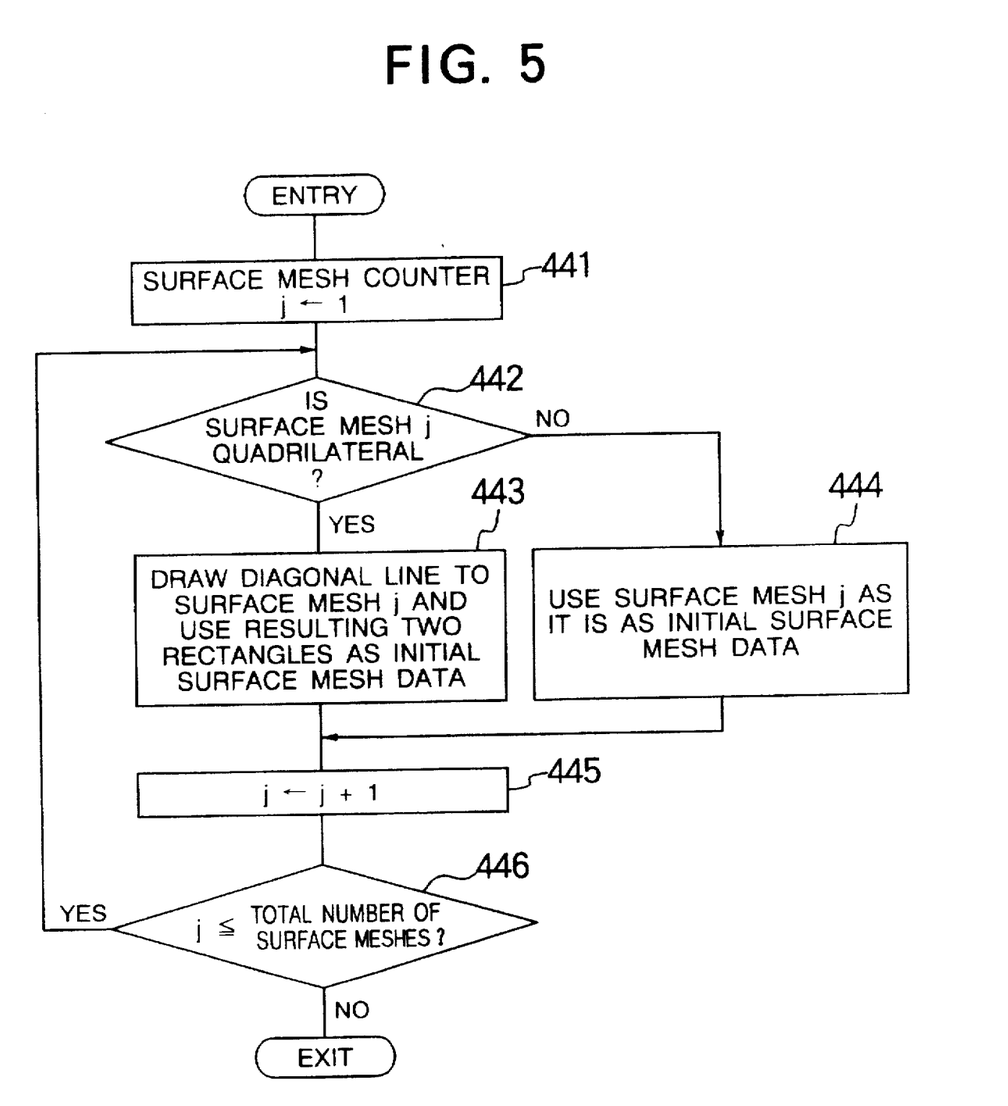
FIG. 5 shows a flow chart of a more detailed process of a step 404 in the flow chart shown in FIG. 4;.

The process of the step 404 of FIG. 4 is explained in more detail by referring to FIG. 5.

A plurality of surface meshes forming a joining plane (for example, FIG. 7 to be explained later) of a sub-area (for example, 501 in FIG. 6 to be explained later) for which the mesh has been generated are assigned with numbers. In FIG. 5, in a step 441, a surface mesh counter j comprising a register (not shown) in the processing unit 2 of FIG. 1 or a memory area in the memory 1 is set to 1 to designate a first surface mesh. In a step 442, whether the designated surface mesh j is a quadrilateral or not is determined. If the step 442 determines that the designated surface mesh j is not quadrilateral, the surface mesh j is a triangle and it is used as it is as the initial surface mesh data of the sub-area 502. If the step 442 determines that the designated surface mesh j is a quadrilateral, a diagonal line is drawn in the quadrilateral to divide it into two triangles which are used as the initial surface mesh data. After the step 443 or 444, the process proceeds to a step 445 to increment the surface counter j by one. In a step 446, whether the content of the surface mesh counter j exceeds the total number of meshes of the joining plane abcd of the sub-area or not. If it exceeds, the process is terminated, and if it does not exceed, the process returns to the step 442 to continue the process for the next mesh.

An application of the process of the tetrahedron mesh generation unit 101 of FIG. 1 described above is explained for a shape shown in FIG. 6.

Figure 6:
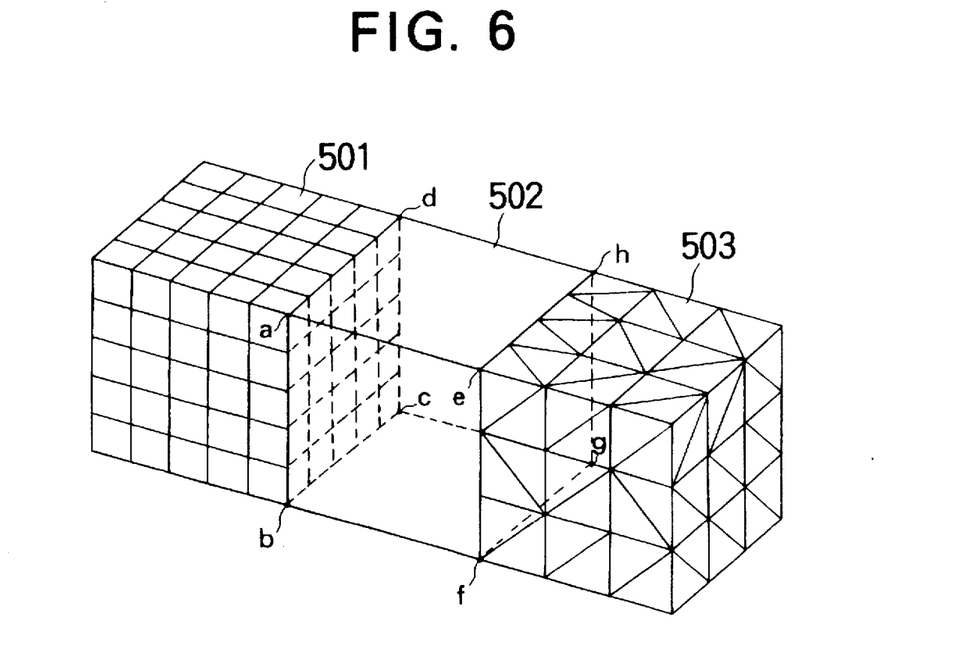
FIG. 6 shows a perspective view of an analysis area including a sub-area 502 for which a mesh has not been generated.

The shape shown in FIG. 6 comprises three sub-areas. A sub-area 501 has a mesh thereof generated by the hexahedron elements by the hexahedron mesh generation unit 105 of FIG. 1. A sub-area 503 has a mesh thereof generated by the tetrahedron elements by the tetrahedron mesh generation unit 101 of FIG. 1. On the other hand, a sub-area 502 has no mesh generated yet.

Figure 7:
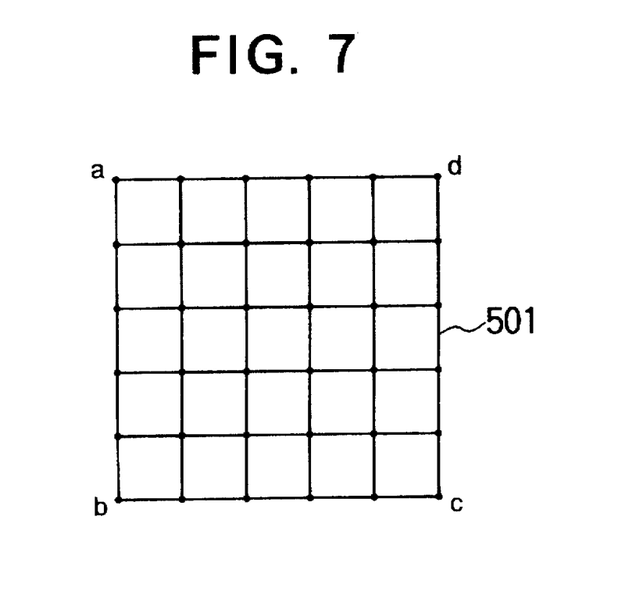
FIG. 7 shows a mesh shape on a joining plane of a sub-area 501 and a sub-area 502 shown in FIG. 6.

A process when the tetrahedron mesh generation unit 101 of FIG. 1 is applied to the sub-area 502 is explained by referring to a flow chart of FIG. 4. The sub-area 502 consists of six planes abcd, efgh, abfe, dcgh, daeh and cbfg. Of those, the planes abcd and efgh are adjacent to the sub-area for which the mesh has been generated. The remaining four planes are not adjacent to the sub-area for which the mesh has been generated. Thus, the steps 402, 403, 406 and 407 of FIG. 4 are executed six times, respectively, the step 404 is executed twice and the step 405 is executed four times. The content of the step 404 for the plane abcd is as follows. First, the surface mesh shape on the joining plane to the sub-area 501 which is the adjacent sub-area is fetched. The fetched surface mesh shape is shown in FIG. 7.

Figure 10:
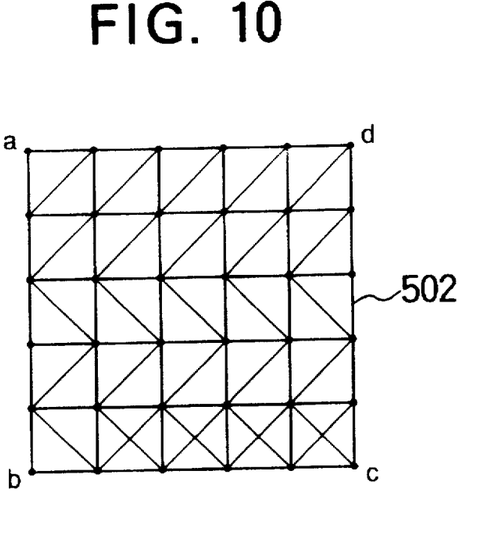
FIG. 10 shows a mesh shape on a joining plane of the sub-area 502 and the sub-area 501 shown in FIG. 6 after the mesh has been generated.
Figure 11:
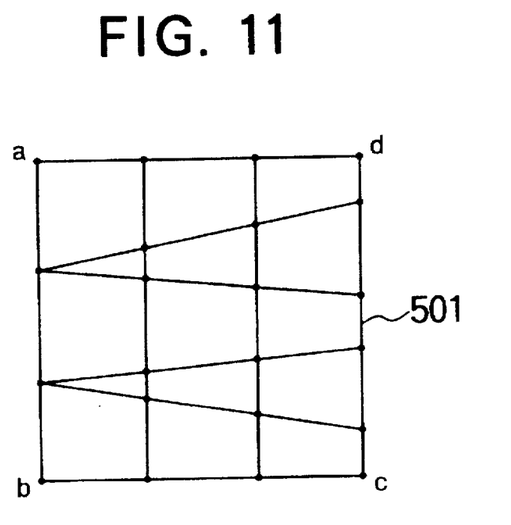
FIG. 11 shows a mesh shape of a joining plane of the sub-area 501 and the sub-area 502 shown in FIG. 6.

In this case, since the shape of the surface mesh are formed by quadrilateral meshes, a diagonal line is drawn to each of the quadrilateral to divide it into two triangles which are used as the initial surface mesh data. FIG. 10 shows the initial surface mesh shape thus generated. The shape of the surface mesh may be a combination of a quadrilateral and a triangle as shown in FIG. 11. Even in such a case, all meshes may be made to rectangles by the steps 443 and 444 of FIG. 5.

Figure 8:
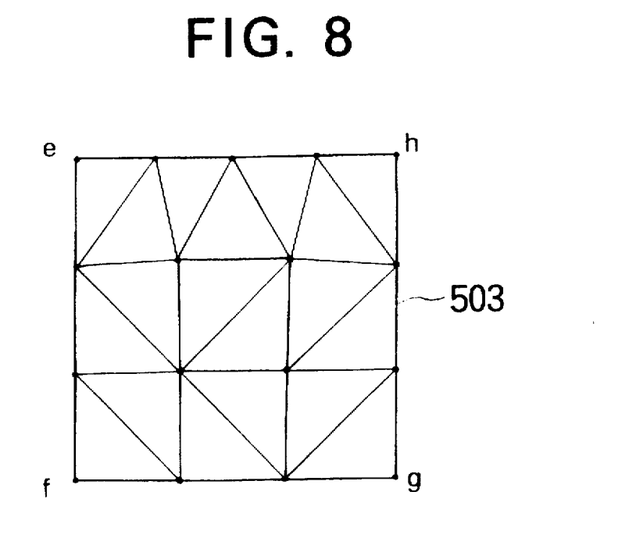
FIG. 8 show a mesh shape on a joining plane of a sub-area 503 and a sub-area 502 shown in FIG. 6.

On the other hand, the content if the step 404 for the plane efgh is as follows. First, the surface mesh shape on the joining plane to the sub-area 503 which is the adjacent sub-area is fetched. An example of the fetched surface mesh is shown in FIG. 8. Since the surface mesh shape is formed by triangle meshes, it is used as it is as the initial surface mesh data. For the remaining four planes, the initial surface mesh data is generated in the step 405 in the manner described in the above reference, pages 203–205. When the initial surface meshes have been generated for all of the six planes, the process proceeds to a step 408 to generate the tetrahedron elements in the sub-area by using the technique described in the above reference, pages 205–206. They are generated such that the surface mesh shape matches to the initial surface mesh data. Finally, in a step 409, the mesh data in the sub-area and the initial surface mesh data are registered.

Figure 9:
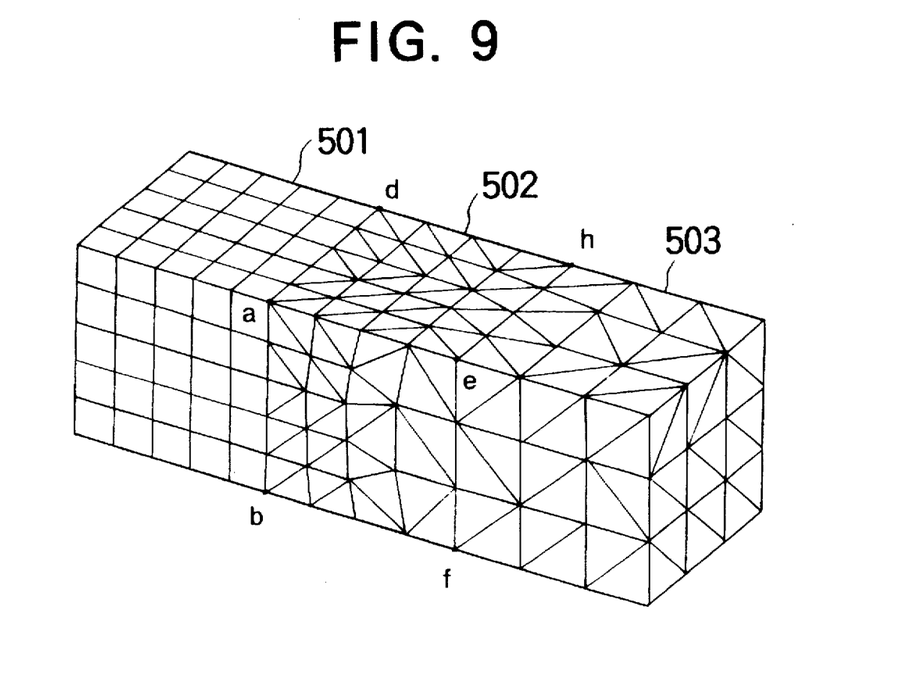
FIG. 9 shows a perspective view of a mesh generated by a tetrahedron mesh generation unit 101 for the sub-area 502 shown in FIG. 6.

An example of the mesh generated by the tetrahedron elements in the sub-area 502 is shown in FIG. 9. By the above process, the mesh shape on the joining plane to the sub-area 502 in the sub-area 501 is formed by the quadrilaterals as shown in FIG. 7 and the mesh shape on the joining plane to the sub-area 501 in the sub-area 502 is formed by the triangles as shown in FIG. 10. As seen from the comparison of FIGS. 7 and 8, in accordance with the present embodiment, the number of nodes and the positions thereof in the joining plane of the sub-areas 501 and 502 completely match and the division patterns of the meshes are very similar.

In the present embodiment, the object to be analyzed is divided into sub-areas and all sub-areas have the meshes thereof automatically generated by the hexahedron elements, and the sub-areas for which the meshes cannot be generated by the hexahedron elements are automatically generated by the tetrahedron elements. The following process may also be used by applying the gist of the present invention.

Figure 13:
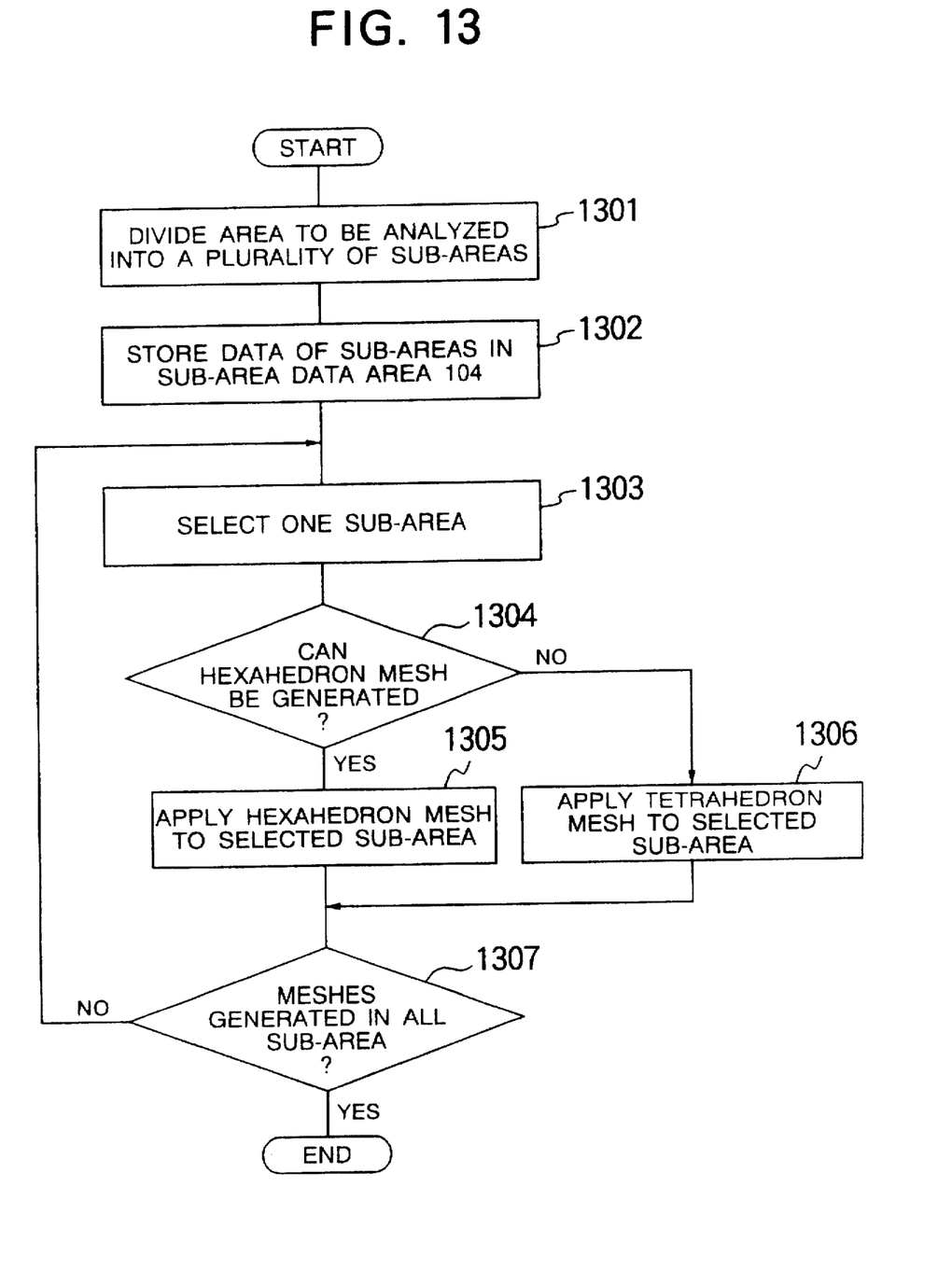
FIG. 13 shows another mesh generation process in the present invention.

FIG. 13 shows another process for generating the mesh in accordance with the present invention. In FIG. 13, in a step 1301, a three-dimensional area to be analyzed is divided into a plurality of sub-areas manually by a user or automatically by a computer (CPU). Data of the sub-areas divided in the step 1301 is stored in the sub-area data area 104 of FIG. 1 in a step 1302. In a step 1303, one of the divided sub-areas is selected manually by the user or automatically by the computer (CPU). In a step 1304, whether the mesh of the selected sub-area can be generated by the hexahedron elements or not based on the status of the adjacent sub-areas. If it can be generated by the hexahedron elements, the hexahedron mesh is generated for the selected sub-area in a step 1305. If it cannot be generated by the hexahedron elements in the decision of the step 1404, a tetrahedron mesh is generated for the selected sub-area in a step 1306. After the step 1305 or 1306, the process proceeds to a step 1307 and the selection of the sub-area is repeated until all sub-areas have been selected.

In the step 1303, when the user manually selects one of the sub-areas, the generation of the mesh for the sub-area mat be forcibly terminated.

In accordance with this process, an interactive process such as the generation of a fine mesh in a particular sub-area may be attained.

In accordance with the embodiments of the present invention, the mesh generation method by the hexahedron elements and the mesh generation method by the tetrahedron elements are used in combination to generate the mesh for the entire area to be analyzed so that the hexahedron elements are generated in the area which requires the precision of analysis and the tetrahedron elements are generated in other area. Further, the hexahedron elements may be generated for the area of relatively simple shape and the tetrahedron elements may be generated for the area of complex shape.

As a result, for the area to be analyzed which is so complex in shape that only one of the mesh generation by the hexahedron elements with huge amount of manpower and the mesh generation by the tetrahedron elements at the expense of the precision of analysis in the prior art may be processed for the mesh generation with a high precision of analysis and a small manpower.

What is claimed is:

1. A method for generating an analyzing mesh for a three-dimensional area to be analyzed divided into a plurality of sub-areas by using a computer, comprising the steps of:

(a) storing information on a mesh shape on a surface of at least one sub-area in a memory;

(b) searching from said memory the information on the mesh shape on a joining plane to the area for which the mesh is to be generated, of the sub-area adjacent to the sub-area for which the mesh is to be generated;

(c) determining the mesh shape on the joining plane based on the searched information, and when the mesh shape on the joining plane contains a quadrilateral, drawing a diagonal line to each of the quadrilateral to define two triangles to generate a surface mesh shape formed by triangles from the mesh shape of the joining plane containing the quadrilateral; and (d) using the surface mesh shape formed by the triangles as one of initial surface mesh data of the area for which the mesh is to be generated.

2. A method for generating an analyzing mesh for a three-dimensional area to be analyzed divided into a plurality of sub-areas by using a computer, comprising the steps of:

(a) storing information on mesh shapes on surfaces of a plurality of sub-areas in a memory;

(b) searching from said memory the information on the mesh shapes on joining planes to the area for which the mesh is to be generated, of at least two sub areas adjacent to the sub-area for which the mesh is to be generated;

(c) determining the mesh shapes on the joining planes based on the searched information, and when at least one of the mesh shapes on the joining plane is formed by only triangles and at least one of the mesh shapes on the joining plane contains a quadrilateral, drawing a diagonal line to each of the quadrilateral to define two triangles to generate a surface mesh shape formed by triangles from the mesh shape of the joining plane containing the quadrilateral; and (d) using the surface mesh shape formed by the triangles as one of initial surface mesh data of the area for which the mesh is to be generated.

3. A method for generating an analyzing mesh according to claim 1, further comprising a step of:

(e) generating a hexahedron mesh in the area for which the mesh is to be generated by using the initial surface mesh data.

4. A method for generating an analyzing mesh according to claim 2, further comprising a step of:

(f) generating a hexahedron mesh in the area for which the mesh is to be generated by using the initial surface mesh data.

5. A method for generating an analyzing mesh according to claim 1, wherein the initial surface mesh data for the area for which the mesh is to be generated derived in said step (d) is stored in said memory as the information on the mesh shape of the surface of the area for which the mesh is to be generated.

6. A method for generating an analyzing mesh according to claim 2, wherein the initial surface mesh data for the area for which the mesh is to be generated derived in said step (d) is stored in said memory as the information on the mesh shape of the surface of the area for which the mesh is to be generated.

7. A method for generating an analyzing mesh according to claim 1, further comprising a step of forming a surface of a mesh shape formed by a plurality of triangles on a surface other than the joining plane to another sub-area, of the area for which the mesh is to be generated and using that surface as other one of the initial surface mesh data of the area for which the mesh is to be generated.

8. A method for generating an analyzing mesh according to claim 2, further comprising a step of forming a surface of a mesh shape formed by a plurality of triangles on a surface other than the joining plane to another sub-area, of the area for which the mesh is to be generated and using that surface as other one of the initial surface mesh data of the area for which the mesh is to be generated.

9. A method for generating an analyzing mesh for generating a mesh for an entire three-dimensional area by generating a mesh for each of a plurality of sub-areas using a computer, comprising the steps of:

dividing an area to be analyzed into a plurality of sub-areas;

determining whether a hexahedron mesh area can be generated in all of the divided sub-areas;

generating the hexahedron mesh area for the sub-area which allows the generation of the hexahedron mesh;

generating a tetrahedron mesh area for the sub-area which does not allow the generation of the hexahedron mesh;

for the sub-area joining to the hexahedron mesh area and the tetrahedron mesh area, generating a tetrahedron mesh area having complete match between coordinates of all nodes on the plane belonging to the sub-area generated by the tetrahedron elements and adjoining to the sub-area generated by the hexahedron elements and coordinates of all nodes on the plane belonging to the sub-area generated by the hexahedron elements and adjoining to the sub-area generated by the tetrahedron elements in a boundary area of the mesh areas.

10. A method for generating an analyzing mesh for generating a mesh for an entire area by generating a mesh for each of a plurality of sub-areas using a computer, comprising the steps of:

dividing an area to be analyzed into a plurality of sub-areas;

determining whether a hexahedron mesh area can be generated in all of the divided sub-areas;

generating the hexahedron mesh area for the sub-area which allows the generation of the hexahedron mesh;

generating a tetrahedron mesh area for the sub-area which does not allow the generation of the hexahedron mesh;

for the sub-area joining to the hexahedron mesh area and the tetrahedron mesh area, for each quadrilateral forming a surface mesh on the joining plane to the adjacent sub-area for which the mesh is generated by the hexahedron elements, defining an aggregation of two triangles defined by drawing a diagonal line to the quadrilateral as the surface mesh shape to form meshes by the tetrahedron elements therein to generate tetrahedron mesh areas having complete match between coordinates of all nodes and coordinates of all nodes on the joining plane belonging to the sub-area generated by the hexahedron elements and adjoining to the sub-area generated by the tetrahedron elements.

11. An apparatus for automatically generating an analyzing mesh by generating a mesh for an entire area by generating a mesh for each of a plurality of sub-areas, comprising:

means for generating a mesh by hexahedron elements in a sub-area;

means for generating a mesh by tetrahedron elements in a sub-area;

means for searching a sub-area for which a mesh has been generated and which is adjacent to a sub-area for which a mesh is to be generated;

means for extracting a surface mesh shape adjacent to the sub-area for which the mesh is to be generated in each of the searched adjacent sub-areas for which the meshes have been generated; and processing means for generating the mesh in the sub-area for which the mesh is to be generated by defining the surface mesh shape on the joining plane to the sub-area for which the mesh is to be generated as quadrilateral when the extracted surface mesh shape is formed by only quadrilaterals and defining the surface mesh shape on the joining plane to the sub-area for which the mesh is to be generated as triangle when the extracted surface mesh shape if formed by only triangles or a combination of triangles and quadrilaterals or it is known that the mesh cannot be generated by the hexahedron elements in the sub-area for which the mesh is to be formed.

* * * * *